United States Patent Office 3,504,398
Patented Apr. 7, 1970

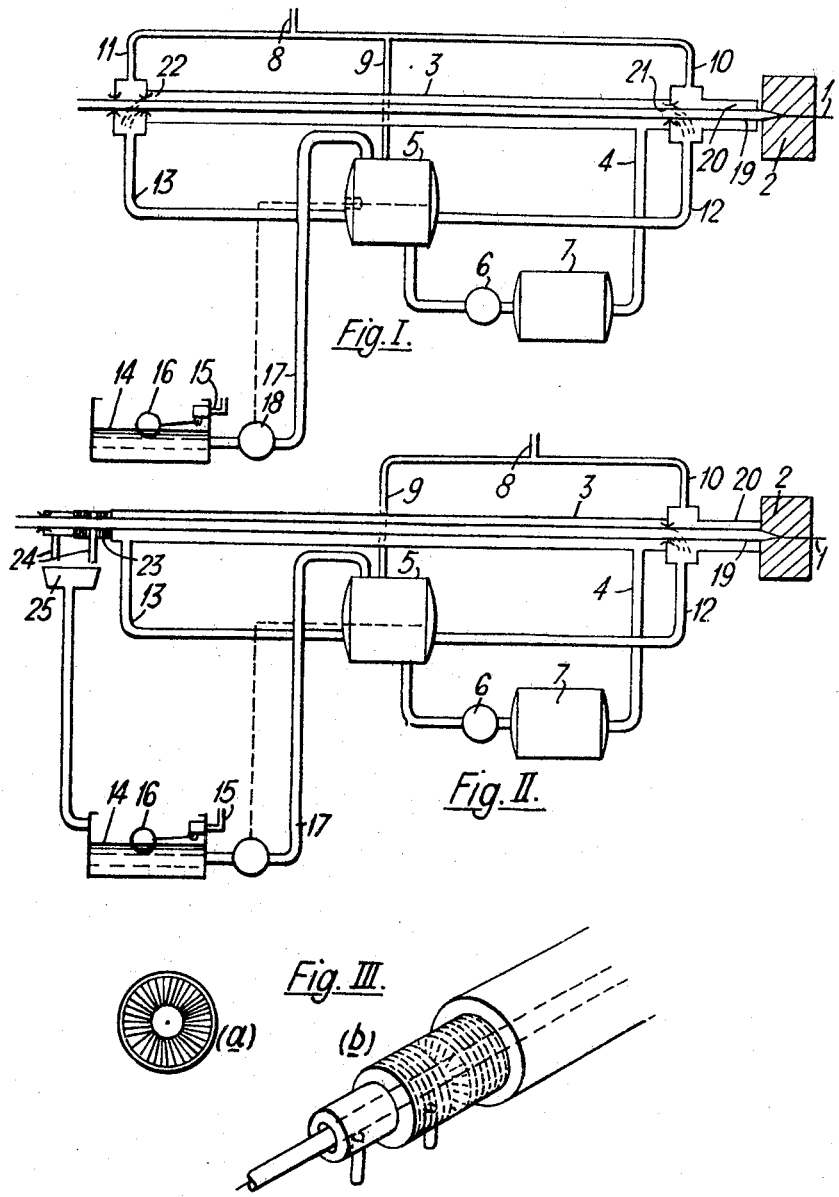

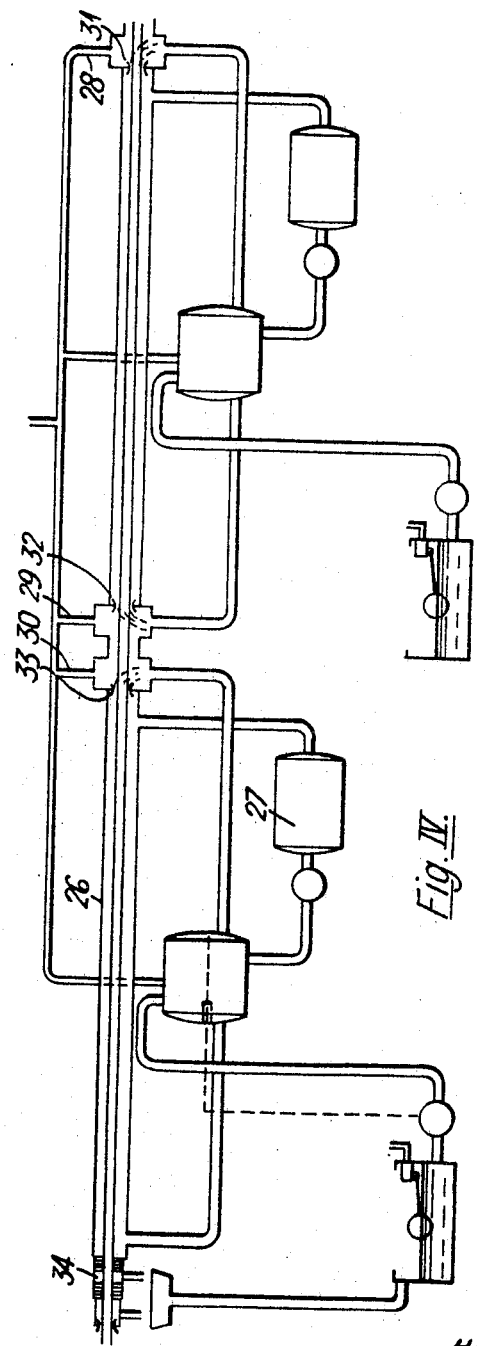

3,504,398
ELECTRIC CABLES
Hayden Albert Moore and Colin Francis Greening Smith, London, England, assignors to International Standard Electric Corporation, New York, N.Y., a corporation of Delaware
Filed Dec. 28, 1967, Ser. No. 694,272
Int. Cl. B29h 5/28
U.S. Cl. 18—6
12 Claims

ABSTRACT OF THE DISCLOSURE

Extruded cable insulation is maintained under gas and liquid pressure in a compression chamber to prevent formation of cavities in the plastic material. An extension of the chamber provides improved results with a circulating device disposed in the additional path.

---

The invention relates to a method of and apparatus for manufacturing electric cables.

When a layer of plastics material is extruded over a cable core, cavities may be formed in the layer of plastics material. Such cavities may be formed as a result of gases or vapours emerging from the cable core and are undesirable because they tend to impair the reliability of the cable insulation.

According to the present invention there is provided apparatus for manufacturing electric cable comprising an extruder head for applying a layer of thermoplastic material over the core of the cable, a compression chamber for applying pressure to said cable to oppose the formation of cavities in the thermoplastic material, means for maintaining gas under pressure in a first portion of said compression chamber and means for circulating liquid through a second portion of said compression chamber, wherein the orifice of said extruder head communicates directly with said first portion which provides a pocket for gas to prevent liquid in said second portion from coming into contact with said extruder orifice wherein the means for maintaining gas under pressure in said first portion communicates with a further portion of the circulating path of the liquid, and wherein said circulating means is in said path intermediate said first portion and said further portion.

The invention will now be described with reference to the accompanying drawings, in which:

FIG. 1 is a side sectional view of a first embodiment;

FIG. 2 is a side sectional view of a second embodiment;

FIG. 3 shows in more detail a cylindrical brush used in the second embodiment.

FIG. 4 is a side sectional view of a third embodiment.

Referring now to FIG. 1, there is shown a cable core 1, an extrusion machine 2, and a compression and cooling chamber 3 directly connected to the outlet of the extrusion machine. A water inlet 4 delivers water to the chamber 3 from a water storage tank 5 via a water pump 6 and a water heater 7. A gas inlet 8 is connected via pipes 9, 10 and 11 to the water storage tank 5 and to each end of the chamber respectively. Baffles 21 and 22 are provided in the chamber adjacent to gas pipes 10 and 11. Water outlets 12 and 13 from each end of the chamber 3 return water to the storage tank 5. The water circulating system is completed by a make-up tank 14 having a water inlet 15 controlled by a ball cock 16. The make-up tank 14 is connected to the storage tank 5 by a pipe 17 via an injection pump 18 which is controlled by the level of water in the storage tank 5.

In operation, the cable core 1 passes through the extrusion machine 2 and is enclosed in polythene insulation in a heated condition to form an insulated conductor 19 which passes into the compression and cooling chamber 3. Water from the storage tank 5 is pumped through the chamber 3 by the pump 6. The water heater 7 heats the water to a temperature suitable for cooling thick walled polythene insulation. Gas pressure sufficient to oppose the formation of cavities in the polythene is applied to the water circulating system via gas inlet 8 and pipe 9. With this arrangement the water circulating system is completely independent of the application of the gas pressure. Water entering the chamber from the inlet pipe 4 divides into two streams, one stream flowing out through pipe 12 and the other flowing out through pipe 13. Baffles 21 and 22 are provided at each end of the chamber to facilitate a reduction in pressure. A pocket of gas in a portion of the chamber 20 adjacent to the extrusion machine orifice prevents the water in the chamber from coming in contact with the extruder head. Water from the pipes 12 and 13 is returned to the storage tank 5.

Referring now to the embodiment shown in FIG. 2, the gas inlet 11 and the baffle 22 are omitted and instead a cylindrical brush 23 having an axial aperture for permitting passage of the cable is provided in an end portion of the chamber, on the far side of the outlet 13. The brush is shown in more detail in FIG. 3. FIG. 3a shows the brush in cross section and FIG. 3b is an isometric view of the brush in the chamber. The brush facilitates a reduction of pressure at the end of the chamber. Water escaping through the brush is drained off at atmospheric pressure through pipe 24 into a tundish 25, from which it is returned to the system via make-up tank 14.

In a third embodiment shown in FIG. 4, the insulated conductor is passed through a further compression and cooling chamber 26 which ensures that the polythene insulation has completely hardened before it is cooled either naturally or in further unpressurised cooling chambers. The water circulating system for the second chamber is similar to that of the first, the heater 27 heating the water being fed to the second chamber to a temperature below that of the water in the first chamber. Baffles 31, 32 and 33 facilitate a reduction of pressure at both ends of the first chamber and at the adjacent end of the second chamber, and a cylindrical brush 34 is provided in the end of the second chamber remote from the first chamber.

The arrangements described permit pressure to be applied to the insulation while it retains the heat from the extrusion process and is still in a deformable state. It is thus possible to inhibit the formation of cavities before the insulation has hardened.

The direct attachment of the extrusion machine to the compression and cooling chamber permits this pressure to be applied at the earliest possible point after the actual extrusion and permits more rapid cooling of the insulation, which is desirable since it is considered advantageous to harden the skin of this layer of thermoplastic material as quickly as possible.

It is to be understood that the foregoing description of specific examples of this invention is made by way of example only and is not to be considered as a limitation on its scope.

We claim:
1. Apparatus for manufacturing electric cable comprising an extruder head for applying a layer of thermoplastic material over the core of the cable, a compression chamber for applying pressure to said cable to oppose the formation of cavities in the thermoplastic material, means for maintaining gas under pressure in a first portion of said compression chamber and means for circulating liquid through a second portion of said compression chamber adjacent said first portion, wherein the orifice of said extruder head communicates directly with said first portion which provides a pocket for gas to prevent liquid in said second portion from coming into contact with said extruder orifice, the path of said circulating liquid including a further portion, wherein said means for maintaining gas under pressure in said first portion communicates with said further portion, said circulating means being in said path intermediate said second portion and said further portion.

2. Apparatus according to claim 1, wherein the circulating path of the liquid includes a liquid storage means, wherein said further portion includes a volume for containing gas in said storage means above the level of the liquid therein, and wherein the means for circulating said liquid comprises liquid pumping means between the liquid storage means and chamber.

3. Apparatus according to claim 2, comprising means for heating the liquid in its path from the liquid storage means to said chamber.

4. Apparatus according to claim 1 wherein the means for maintaining gas under pressure communicates also with a third portion of the chamber along said cable remote from the first portion.

5. Apparatus according to claim 4, comprising a liquid outlet from said third portion, and a baffle between said third portion and outlet.

6. Apparatus according to claim 1, comprising a third portion of the chamber remote from said first portion, a liquid outlet from said third portion and a baffle adjacent said third portion outlet, said baffle being constituted by a cylindrical brush having an axial aperture for permitting the passage of the cable therethrough.

7. Apparatus according to claim 6, comprising a further outlet for liquid passing through said brush, and means for pumping the liquid from said brush back into the circulating path of the liquid.

8. Apparatus according to claim 1, comprising a further compression chamber for applying pressure to the cable moving from the first compression chamber to oppose the formation of cavities in the thermoplastic material, wherein said means for maintaining gas under pressure communicates with a first portion of the further chamber, wherein means are provided for circulating liquid through a second portion of the further chamber adjacent said first portion thereof, wherein the means for maintaining gas communicates with a further portion of the circulating path of the liquid through the further chamber, and wherein said circulating means for said further chamber is in said path intermediate said second and further portions of said further chamber.

9. Apparatus according to claim 8, wherein the circulating path of the liquid through the further chamber includes a further liquid storage means, wherein said further portion of the further circulating path includes a volume for containing gas in said further storage means and wherein said means for circulating said liqiud through the further chamber comprises liquid pumping means between the further liquid storage means and further chamber.

10. Apparatus according to claim 9, comprising means for heating liquid in its path from the further liquid storage means to the further chamber to a temperature below that of the liquid in the first said chamber.

11. Apparatus according to claim 8, comprising a third portion of said further chamber, a liquid outlet therefrom, and a baffle adjacent said third portion outlet of said further chamber.

12. Apparatus according to claim 11, wherein said third portion baffle is constituted by a cylindrical brush having an axial aperture for permitting the passage of the cable therethrough.

References Cited
UNITED STATES PATENTS

| | | | |
|---|---|---|---|
| 2,446,620 | 8/1948 | Swallow et al. | 18—6 |
| 2,561,820 | 7/1951 | Ramsey et al. | 18—6 XR |
| 2,832,993 | 5/1958 | Cox | 18—6 XR |
| 2,952,870 | 9/1960 | Mark | 18—6 |
| 3,130,447 | 4/1964 | Karl et al. | 18—6 |
| 3,295,163 | 1/1967 | Bachus | 18—13 XR |

WILLIAM J. STEPHEN, Primary Examiner

U.S. Cl. X.R.

18—13